United States Patent
Chbat

Patent Number: 6,026,204
Date of Patent: Feb. 15, 2000

[54] MATCHING APPARATUS FOR AN OPTICAL COMMUNICATIONS NETWORK

[75] Inventor: Michel Chbat, Gentilly, France

[73] Assignee: Alcatel, Paris, France

[21] Appl. No.: 08/960,201

[22] Filed: Oct. 29, 1997

[30] Foreign Application Priority Data

Oct. 31, 1996 [FR] France .................................. 96 13322

[51] Int. Cl.[7] ...................................................... G02B 6/28
[52] U.S. Cl. ............................................. 385/24; 359/161
[58] Field of Search ............................. 385/24; 359/115, 359/118, 124, 125, 128, 161

[56] References Cited

U.S. PATENT DOCUMENTS 5,224,183 6/1993 Dugan ....................................... 385/24
5,532,868 7/1996 Gnauck et al. ......................... 359/332
5,600,466 2/1997 Tsushima et al. ...................... 359/124

FOREIGN PATENT DOCUMENTS

0539177A2 4/1993 European Pat. Off. .
0654917A2 5/1995 European Pat. Off. .

*Primary Examiner*—John D. Lee
*Assistant Examiner*—Juliana K. Kang
*Attorney, Agent, or Firm*—Sughrue, Mion, Zinn, Macpeak & Seas, PLLC

[57] ABSTRACT

To improve the performance of an installed network without modifying its structure, matching apparatuses are placed upstream from the nodes of the network. The matching apparatuses are organized to pre-compensate signal distortion caused by the signals being conveyed along possible routes between the transmitter nodes and the other nodes of the network. Application in particular to large terrestrial optical networks.

9 Claims, 3 Drawing Sheets

MATCHING APPARATUS FOR AN OPTICAL COMMUNICATIONS NETWORK

The invention relates to the field of optical communications networks using wavelength multiplexing.

BACKGROUND OF THE INVENTION

Such networks are constituted by a plurality of nodes interconnected by optical links. Each node is provided with "user" inlets and is connected to one or more other nodes by means of corresponding optical lines.

A user message is conveyed from a transmitter node to a destination mode via an optical link comprising lines and possibly intermediate nodes, along a route that is generally a function of the wavelength carrying the message. This spectrum routing function is controlled by a network manager which allocates the wavelengths carrying the messages at each transmitter node and as a function of the destination modes.

Unfortunately, the performance of such a network, in particular in terms of signal quality and of data rate is limited by the optical properties of the links which give rise to physical phenomena causing the optical signals to be degraded. Such phenomena are in particular chromatic dispersion and nonlinearity in the fibers making up the lines, as well as attenuation of the optical power in the fibers, and in certain components such as couplers, switches, multiplexers, demultiplexers, and wavelength converters used in the nodes and all along the lines.

However, means are known for remedying, at least in part, the degradation that such phenomena cause. Thus, attenuation in the fibers can be compensated by means of amplifiers disposed upstream or downstream or all along links. Another known technique referred to as "spectrum inversion" or "phase conjugation" can be advantageously used to correct the effects of chromatic dispersion as well as nonlinearities due to the Kerr effect (variations in the index of a medium depend in linear manner on variations in light intensity). The principle of compensation using spectrum inversion is described in the article "Compensation for channel dispersion by nonlinear optical phase conjugation", Amnon Yariv et al., Optics Letters, Vol. 4, No. 2, February 1979. The conditions to be satisfied for spectrum inversion to correct both chromatic dispersion and nonlinearities were described by S. Watanabe at the IOOC 95 conference that was held from Jun. 26 to 30, 1995 in Hong Kong.

For reasons of simplicity, attempts to improve the performance of a network generally involve compensating or pre-compensating the above-mentioned phenomena at the ends of the lines. Unfortunately, that type of correction, referred to as "point-to-point compensation" assumes that the ends of the fibers are accessible so that it is possible to interpose compensation apparatuses between the ends and the nodes. Such modification is costly, and is not always possible in already-installed networks, especially when the networks are large.

OBJECTS AND SUMMARY OF THE INVENTION

An object of the invention is to remedy that drawback. To this end, the invention provides matching apparatus for an optical communications network comprising a plurality of nodes interconnected via optical links, said nodes being suitable for selectively transferring wavelength multiplex spectrum components, it being possible for such transfers to take place from at least one inlet of at least one transmitter node to destination modes via said links of the network and along predefined routes, said matching apparatus comprising means suitable for selectively applying transformations to the spectrum components of an input multiplex so as to generate respective pre-compensated spectrum components, said transformations being organized to pre-compensate the signal distortions caused while the signal is being conveyed along the respective possible predefined routes between a transmitter node and said destination nodes, said pre-compensated spectrum components being intended to be applied to the inlet of said transmitter node.

In a first embodiment, the matching apparatus further comprises:

pre-compensation modules associated respectively with said transformations, each module contributing to pre-compensating the chromatic dispersions and/or the nonlinear effects due to the optical links embodying one of said possible predefined routes; and directing means for selectively coupling each spectrum component of the input multiplex to one of said modules.

In a particular embodiment aimed essentially at correcting chromatic dispersion, each pre-compensation module comprises a dispersive fiber having a first end coupled to said directing means and a second end coupled to a spectrum inverter, and the dispersion characteristics and the length of said dispersive fiber are functions of one of said possible predefined routes so that the total dispersion generated by the dispersive fiber is equal to the total dispersion generated by the optical links embodying said route.

In another variant aimed at correcting both chromatic dispersion and nonlinearities, each pre-compensation module comprises a dispersive fiber having a first end coupled to said directing means via an optical amplifier, and a second end coupled to a spectrum inverter, and the gain of said amplifier and the characteristics of said dispersive fiber are functions of one of said possible predefined routes so that the total dispersion and the total nonlinear phase generated by the dispersive fiber are equal to the total dispersion and the total nonlinear phase generated by the optical links.

The invention also provides an optical communications network of the above-defined type, in which the inlet of at least one of the transmitter nodes is coupled to matching apparatus of the invention.

BRIEF DESCRIPTION OF THE DRAWINGS

Other aspects and advantages of the invention appear from the remainder of the description given with reference to the figures, in which.

MORE DETAILED DESCRIPTION

Figure 1:
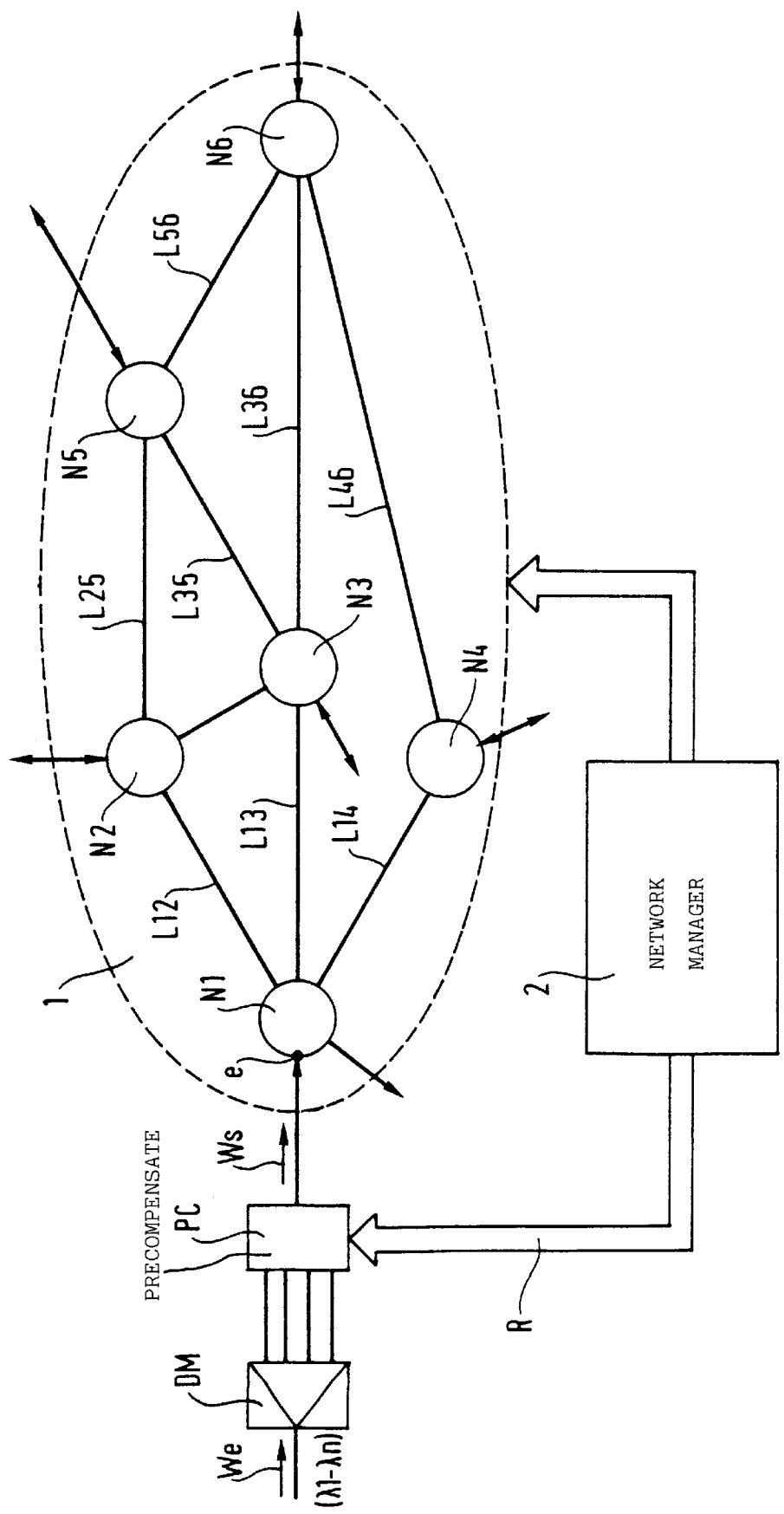
FIG. 1 diagrammatically shows a transmission network associated with matching apparatus of the invention.

FIG. 1 shows an optical communications network 1 composed of a plurality of nodes N1–N6. The nodes of the network are interconnected by optical lines L12–L56 directly or otherwise. The nodes are further connected via suitable links (represented by double-headed arrows) to users external to the network. Such users deliver messages to them in the form of modulated optical carrier waves forming wavelength multiplexes. Each node is normally organized to transfer selectively the spectrum components of the multiplexes received from users or from other nodes to the lines of the network to which it is coupled.

Thus, each node, e.g. N1, has an inlet e suitable for receiving a user multiplex to be conveyed via the network. The network includes a spectrum switch connected to this inlet so as to direct the spectrum components of the received multiplex selectively to the lines L12, L13, L14.

The network 1 is controlled by a network manager 2 which constrains the user messages to be carried by wavelengths associated with the destination nodes. These wavelengths also correspond to determined routes between the message transmitter nodes and the message receiver nodes.

In a normal network, the user multiplex which, to access the network, uses, for example, the node N1, is applied directly to the inlet e of said node. In contrast, in accordance with the invention, the user multiplex is not applied directly to the inlet e of the node N1, but rather it is applied via matching apparatus PC. The user multiplex thus constitutes an input multiplex We for the apparatus PC which delivers a pre-compensated multiplex Ws to be applied to the inlet e. As shown in FIG. 1, when the input multiplex We is not available in the form of spectrum components $\lambda 1-\lambda n$ separated in space, a demultiplexer DM must be disposed at the inlet of the matching device PC.

Figure 2:
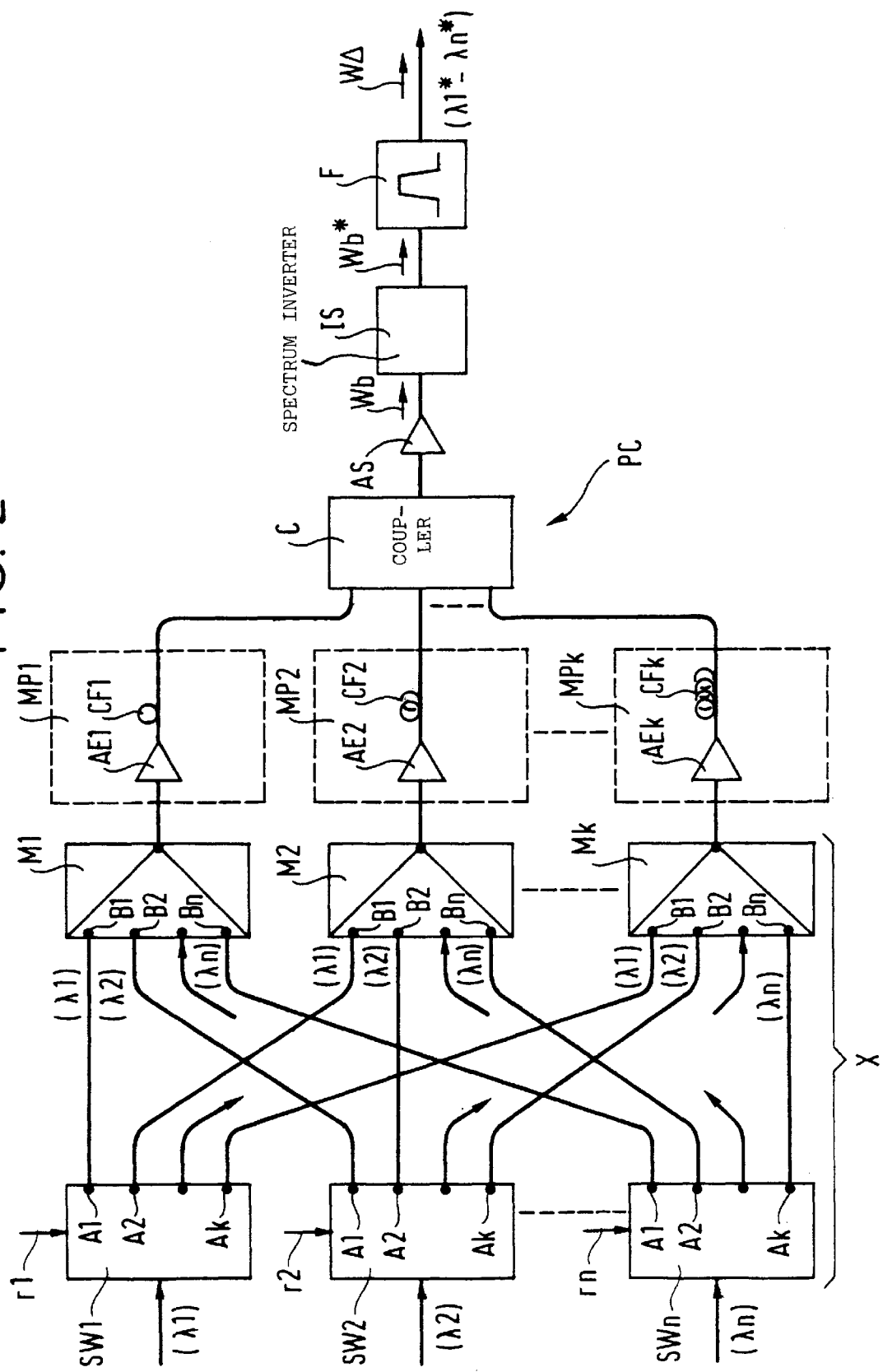
FIG. 2 shows an embodiment of matching apparatus of the invention.

By way of example, FIG. 2 shows an embodiment of the matching apparatus PC which makes it possible to pre-compensate the chromatic dispersion and the nonlinear effects due to the optical links embodying the various possible routes between a transmitter node and the other nodes of the network.

The apparatus includes directing means X connected to k pre-compensation modules MP1, MP2, MPk, a coupler C whose inlets are connected to the modules MP1, MP2, MPk and whose outlet is connected to a spectrum inverter IS via an optical amplifier As. The outlet of the spectrum inverter is connected to a filter F.

The pre-compensation modules MP1, MP2, MPk correspond respectively to k predefined routes between the node in question and the other nodes of the network. The same module may be associated with a single route or with a plurality of routes if the routes have the same properties to be pre-compensated.

The directing means X include n space-division switches SW1, SW2, SWn respectively receiving the n spectrum components $\lambda 1, \lambda 2, \lambda n$ output, for example, by the demultiplexer DM shown in FIG. 1. Each switch has a number k of outlets A1, A2, Ak.

The directing means X further include k multiplexers M1, M2, Mk whose outlets are coupled respectively to the pre-compensation modules MP1, MP2, MPk. Each of the multiplexers M1–Mk is provided with n inlets B1, B2, Bn respectively set to the wavelengths $\lambda 1, \lambda 2, \lambda n$ of the spectrum components of the input multiplex We. For each multiplexer, that one of its inlets B1–Bn which is set to a given one of the wavelengths $\lambda 1-\lambda n$ is coupled to one of the outputs A1–Ak of that one of the space-division switches SW1–SWn which is organized to receive the spectrum component having the same wavelength.

In the example shown, each pre-compensation module MP1, MP2, MPk is essentially constituted by a dispersive fiber CF1, CF2, CFk coupled to the outlet of an associated multiplexer M1, M2, Mk. To compensate the nonlinear effects, the coupling should be performed via an optical amplifier AE1, AE2, AEk having a matched gain that is high enough to cause appropriate nonlinear effects in the associated dispersive fiber. The other end of each dispersive fiber is coupled directly to the inlet of the coupler C.

If the chromatic dispersion only is to be pre-compensated, each dispersive fiber has a length and dispersion characteristics such that the total dispersion in the fiber is equal to that generated by the optical links of the route(s) associated with the module.

This condition can also be expressed mathematically by the following formula:

$$\int D_1(z_1)dz_1 = \int D_2(z_2)dz_2 \qquad (1)$$

where $z_1$ and $z_2$ are lengths respectively along the dispersive fiber and along the associated link, and $D_1$ and $D_2$ are the dispersion parameters at $z_1$ and $z_2$ respectively along the dispersive fiber and along the link.

It is recalled that the dispersion parameter D is related to the propagation constant $\beta$ by the following relationship:

$$d^2\beta/d\omega^2 = -(2\pi c/\omega^2)D$$

where $\omega$ is the angular frequency and c is the speed of light in a vacuum.

To make it possible to compensate both chromatic dispersion and nonlinearity phenomena, the gain of the amplifier AE1, AE2, AEk associated with the fiber, the length of the fiber, and the dispersion characteristics of the fiber must be chosen such that the total nonlinear phase accumulated in the fiber is equal to the total nonlinear phase accumulated in the associated optical link.

This other condition can also be expressed mathematically by the following formula:

$$\int \gamma_1(z_1)P_1(z_1)dz_1 = \int \gamma_2(z_2)P_2(z_2)dz_2 \qquad (2)$$

where $\gamma_1(z_1)$ and $\gamma_2(z_2)$ are the nonlinearity coefficients at $z_1$ and $z_2$ respectively along the dispersive fiber and along the link, $P_1(z_1)$ and $P_2(z_2)$ being the optical power at $z_1$ and $z_2$ respectively along the dispersive fiber and along the link.

To a first approximation, uniform dispersive fibers may be used. In which case, the formula (1) may be written as follows:

$$L1 \cdot d^2\beta_1/d\omega^2 = L2 \cdot d^2\beta_2/d\omega^2 \qquad (3)$$

where L1 and L2 are respectively the length of the dispersive fiber and the length of the link, $\beta_1$ and $\beta_2$ being respectively the propagation constant of the dispersive fiber and the propagation constant of the link.

However, each of the dispersive fibers may advantageously be made up of a plurality of segments placed end-to-end and having lengths and optical characteristics such that the above conditions (1) and (2) are satisfied as well as possible. In a variant, these segments may be coupled together via amplifiers.

In practice, to guarantee a given signal-to-noise ratio, the power level per channel is imposed at the inlet of the spectrum inverter. For this purpose, an amplifier AS of suitable gain needs to be placed upstream from the inverter. The gains of the amplifiers AE1, AE2, AEk are then imposed as a function of the power of the spectrum components of the input multiplex We and of the losses imparted in the directing means X.

In operation, the space-division switches SW1, SW2, SWn receive, from the network manager 2, the direction commands r1, r2, rn which are functions of the respective routes for the spectrum components λ1, λ2, λn. The spectrum components are then directed to the pre-compensation modules, and they are then transformed by the modules prior to undergoing phase conjugation in the common spectrum inverter IS. The waves Wb* output by the spectrum inverter are then filtered by the filter F so as to allow through only those wavelengths λ1*–λn* of the spectrum components which are the conjugates of the input spectrum components.

Figure 3:
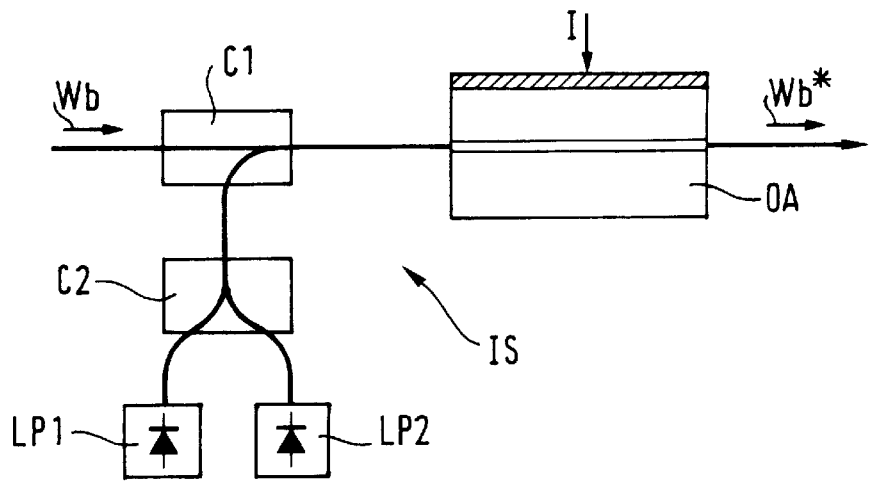
FIG. 3 shows an embodiment of a spectrum inverter that can be used in the matching apparatus of the invention.

FIG. 3 shows a possible embodiment of the spectrum inverter IS. The inverter IS is essentially constituted by a semiconductor optical amplifier OA fed with a pumping current I. By means of the coupler C1 and of the polarization coupler C2, the amplifying medium of the amplifier OA receives the spectrum components of the multiplex Wb that are delivered by the amplifier AS, and two pump waves delivered by respective laser sources LP1 and LP2. The two laser sources LP1 and LP2 deliver cross-polarized waves of angular frequencies ω1 and (ω2. The amplifier OA then delivers a wave Wb* containing the conjugate spectrum components of the spectrum components of the multiplex Wb and, for each spectrum component of angular frequency ωs of the multiplex Wb, the wave Wb* contains a conjugate spectrum component of angular frequency ωc satisfying the following relationship:

$$\omega1+\omega2-\omega s=\omega c$$

Thus, the filter F must allow through all of the wavelengths of the conjugate spectrum components while stopping the wavelengths of the two pump waves and of the spectrum components λ1–λn of the input multiplex. As a result, in practice, the wavelengths of the pump waves must be outside the band of the input multiplex.

Figure 4:
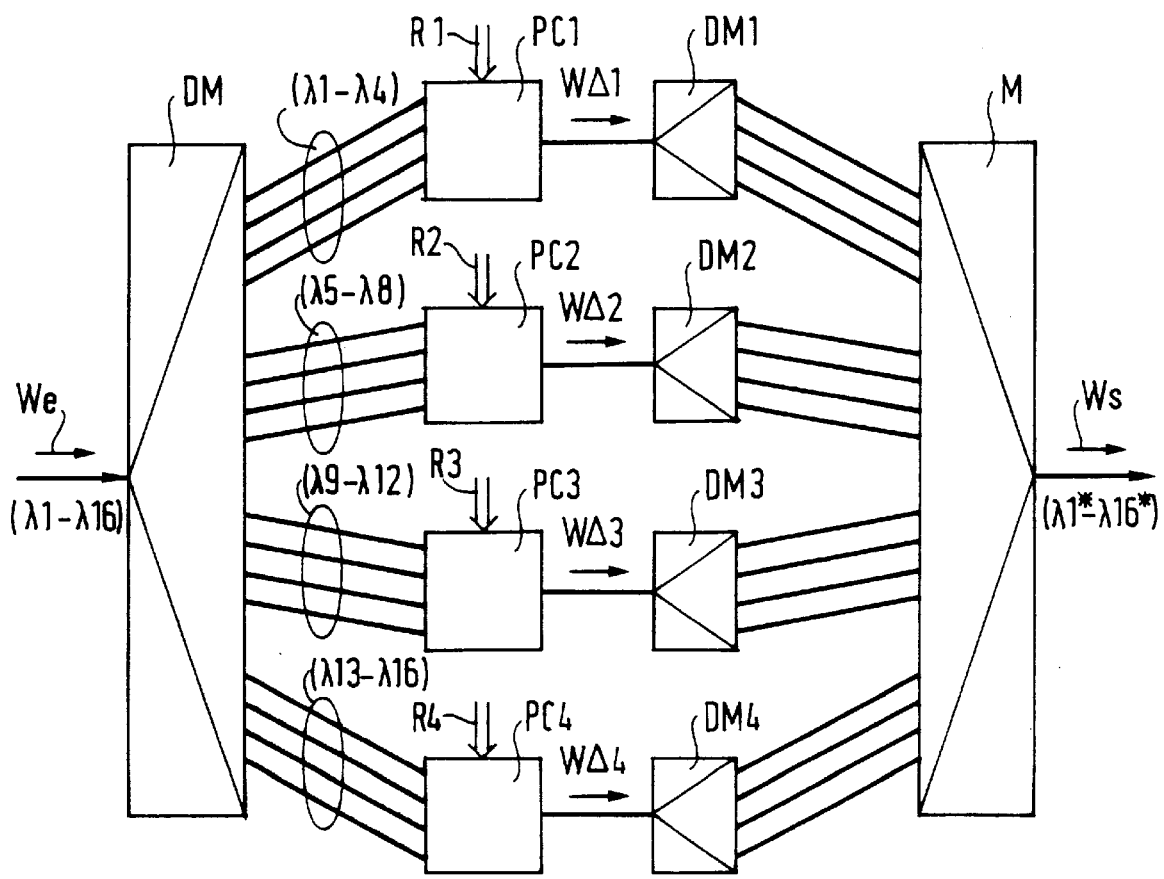
FIG. 4 shows a variant embodiment of the matching apparatus of the invention.

However, spectrum inversion in a nonlinear medium does have limitations as regards the number of spectrum components that can be inverted. This limitation is due to crosstalk between the waves generated in the medium. This limitation may however be overcome by using a plurality of nonlinear media disposed as shown in FIG. 4. This configuration includes a plurality of matching apparatus PC1–PC4, each of which is as shown in FIG. 2. The input multiplex We is subdivided by a demultiplexer DM into a plurality of groups of spectrum components λ1–λ4, λ5–λ8, λ9–λ12, λ13–λ16. The spectrum components in each group are applied to the inlets of an associated matching apparatus PC1–PC4. The output waves Ws1–Ws4 from the matching apparatuses PC1–PC4 are then multiplexed to deliver the final pre-compensated multiplex Ws. This may be done by means of demultiplexers DM1–DM4 receiving respective ones of the waves Ws1–Ws4 and having their outlets coupled to an outlet multiplexer M. In this configuration, in view of the filtering properties of the demultiplexers DM1–DM4 and of the multiplexer M, the filters F at the outlets of the matching apparatuses PC1–PC4 can be omitted.

The invention is not limited to the above-described embodiments. In particular, the spectrum inversion may be performed by means of an offset-dispersion fiber preferably chosen to have a dispersion parameter D of zero for a wavelength equal to the mean of the wavelengths of the spectrum components λ1–λn of the input multiplex and of the conjugate spectrum components λ1–λn*.

The invention also extends to the use of other pre-compensation methods. For example, chromatic dispersion may be pre-compensated by means of a pre-compensation fiber having a dispersion parameter equal and opposite to that of the associated link. It is then possible to use a configuration analogous to that shown in FIG. 2 but without the spectrum inverter IS. Similarly, if the aim is merely to pre-compensate losses, the pre-compensation modules are constituted merely by optical amplifiers whose gains match the losses in the associated links.

I claim:

1. Matching apparatus for an optical communications network comprising a plurality of nodes interconnected via optical links, said nodes being suitable for selectively transferring wavelength multiplex spectrum components, it being possible for such transfers to take place from at least one inlet of at least one transmitter node to destination nodes via said links of the network and along predefined routes, said matching apparatus comprising means suitable for selectively applying transformations to the spectrum components of an input multiplex so as to generate respective pre-compensated spectrum components, said transformations being organized to pre-compensate the signal distortions caused while the signal is being conveyed along the respective possible predefined routes between a transmitter node and said destination nodes, said pre-compensated spectrum components being intended to be applied to the inlet of said transmitter node.

2. Matching apparatus according to claim 1, comprising:
   pre-compensation modules associated respectively with said transformations, each module contributing to pre-compensating the chromatic dispersions and/or the nonlinear effects due to the optical links embodying one of said possible predefined routes; and
   directing means for selectively coupling each spectrum component of the input multiplex to one of said modules.

3. Matching apparatus according to claim 2, wherein each pre-compensation module comprises a dispersive fiber having a first end coupled to said directing means and a second end coupled to a spectrum inverter, and wherein the dispersion characteristics and the length of said dispersive fiber are functions of one of said possible predefined routes so that the total dispersion generated by the dispersive fiber is equal to the total dispersion generated by the optical links embodying said route.

4. Matching apparatus according to claim 3, wherein the second ends of the dispersive fibers of a plurality of modules are coupled to a common spectrum inverter.

5. Matching apparatus according to claim 3, wherein said spectrum inverter includes a semiconductor optical amplifier receiving at least one pump wave.

6. Matching apparatus according to claim 2, wherein each pre-compensation module comprises a dispersive fiber having a first end coupled to said directing means via an optical amplifier, and a second end coupled to a spectrum inverter, and wherein the gain of said amplifier and the characteristics of said dispersive fiber are functions of one of said possible predefined routes so that the total dispersion and the total nonlinear phase generated by the dispersive fiber are equal to the total dispersion and the total nonlinear phase generated by the optical links.

7. Matching apparatus according to claim 2, wherein said directing means comprise:
   space-division switches, each of which is provided with a number of outlets equal to the number k of modules and with at least one inlet for receiving one of the spectrum components of the input multiplex; and
   k multiplexers, each of which is provided with an outlet coupled to one of the modules, and with n inlets set respectively to the wavelengths of said spectrum components;
   and wherein, for each multiplexer, that one of its inlets which is set to a given one of said wavelengths is coupled to one of the outlets of that one of the space-division switches which is organized to receive the spectrum component having the same wavelength.

8. An optical communications network comprising a plurality of nodes interconnected by optical links, said nodes being suitable for selectively transferring wavelength multiplex spectrum components, it being possible for such transfers to take place from at least one inlet of at least one transmitter node to destination modes via said links of the network and along predefined routes, wherein the inlet of at least one of said transmitter nodes is coupled to matching apparatus according to claim 1.

9. Matching apparatus according to claim 1, comprising:

pre-compensation modules associated respectively with said transformations, each module contributing to pre-compensating the chromatic dispersions and the non-linear effects due to the optical links embodying one of said possible predefined routes; and directing means for selectively coupling each spectrum component of the input multiplex to one of said modules.

* * * * *